(12) United States Patent
Edlund

(10) Patent No.: US 7,258,946 B2
(45) Date of Patent: *Aug. 21, 2007

(54) FUEL CELLS AND FUEL CELL SYSTEMS CONTAINING NON-AQUEOUS ELECTROLYTES

(75) Inventor: David J. Edlund, Bend, OR (US)

(73) Assignee: IdaTech, LLC, Bend, OR (US)

(*) Notice: Subject to any disclaimer, the term of this patent is extended or adjusted under 35 U.S.C. 154(b) by 658 days.

This patent is subject to a terminal disclaimer.

(21) Appl. No.: 10/745,407

(22) Filed: Dec. 22, 2003

(65) Prior Publication Data

US 2004/0137312 A1 Jul. 15, 2004

Related U.S. Application Data

(63) Continuation of application No. 09/872,743, filed on Jun. 1, 2001, now Pat. No. 6,667,128.

(60) Provisional application No. 60/208,880, filed on Jun. 1, 2000.

(51) Int. Cl.
*H01M 8/14* (2006.01)
*H01M 8/06* (2006.01)

(52) U.S. Cl. .......................... 429/46; 429/19

(58) Field of Classification Search .................. 429/19, 429/20, 21, 33, 46
See application file for complete search history.

(56) References Cited

U.S. PATENT DOCUMENTS 3,539,395 A * 11/1970 Bartas ........................ 429/17
3,592,696 A * 7/1971 Palmer ..................... 429/46 X
3,765,946 A 10/1973 Werner et al.
3,877,989 A 4/1975 Waldman et al.
4,037,025 A 7/1977 Dey et al.
4,129,683 A 12/1978 Maricle
4,262,063 A 4/1981 Kudo et al.

(Continued)

FOREIGN PATENT DOCUMENTS

JP 8-180891 7/1996

OTHER PUBLICATIONS

Freemantle, Michael, "Eyes on Ionic Liquids," Chemical & Engineering News, pp. 37-50 (May 15, 2000).

(Continued)

*Primary Examiner*—Stephen J. Kalafut
(74) *Attorney, Agent, or Firm*—Kolisch Hartwell, PC

(57) ABSTRACT

Fuel cells and fuel cell systems that include at least one non-aqueous electrolyte. Fuel cells according to the present disclosure may include an anode region that is adapted to receive an anode feed stream containing chemically bound hydrogen and which liberates protons at an anode of the fuel cell, a cathode region that is adapted to receive a stream containing oxygen, and an electrolytic barrier that separates the anode and cathode regions and which contains a non-aqueous electrolyte. The non-aqueous electrolyte is preferably acidic or basic. The electrolyte may have an acid ionization constant ($K_a$) greater than $5 \times 10^{-6}$ at 25° C. if the non-aqueous electrolyte is an acid and a base ionization constant ($K_b$) greater than $5 \times 10^{-6}$ at 25° C. if the non-aqueous electrolyte is a base. The fuel cell has an operating temperature of less than 300° C., and may operate at temperatures above, at, and below 100° C.

56 Claims, 2 Drawing Sheets

U.S. PATENT DOCUMENTS

| | | | |
|---|---|---|---|
| 4,537,840 A | 8/1985 | Tsukui et al. | |
| 4,578,323 A | 3/1986 | Hertl et al. | |
| 4,664,761 A | 5/1987 | Zupancic et al. | |
| RE33,149 E | 1/1990 | Petrow et al. | |
| 4,997,729 A * | 3/1991 | Hatoh et al. | 429/40 |
| 5,344,721 A | 9/1994 | Sonai et al. | |
| 5,409,784 A | 4/1995 | Bromberg et al. | |
| 5,509,942 A | 4/1996 | Dodge | |
| 5,510,209 A | 4/1996 | Abraham et al. | |
| 5,599,638 A | 2/1997 | Surampudi et al. | |
| 5,712,054 A | 1/1998 | Kejha | |
| 5,821,185 A | 10/1998 | White et al. | |
| 5,846,669 A | 12/1998 | Smotkin et al. | |
| 5,861,137 A | 1/1999 | Edlund | |
| 5,897,970 A | 4/1999 | Isomura et al. | |
| 5,965,054 A | 10/1999 | McEwen et al. | |
| 5,997,594 A | 12/1999 | Edlund et al. | |
| 6,022,634 A | 2/2000 | Ramunni et al. | |
| 6,059,943 A | 5/2000 | Murphy et al. | |
| 6,165,633 A | 12/2000 | Negishi | |
| 6,183,914 B1 | 2/2001 | Yao et al. | |
| 6,221,117 B1 | 4/2001 | Edlund et al. | |
| 6,667,128 B2 * | 12/2003 | Edlund | 429/46 |

OTHER PUBLICATIONS

Stinson, Stephen, "Eyes in Ionic Liquids," Chemical & Engineering News, vol. 78, No. 20, pp. 37-50 (May 15, 2000).

English-language translation of Japanese Patent No. JP 8-180891, Jul. 12, 1996, as obtained from the Japanese Patent Office Web site.

* cited by examiner

FUEL CELLS AND FUEL CELL SYSTEMS CONTAINING NON-AQUEOUS ELECTROLYTES

RELATED APPLICATIONS

This application is a continuation of and claims priority to U.S. patent application Ser. No. 09/872,743, now U.S. Pat. No. 6,667,128, which was filed on Jun. 1, 2001, and which claims priority to U.S. Provisional Patent Application Ser. No. 60/208,880, which was filed on Jun. 1, 2000. The complete disclosures of the above-identified applications are hereby incorporated by reference for all purposes.

FIELD OF THE DISCLOSURE

The present invention relates generally to fuel cells and fuel cell systems, and more particularly to fuel cells and fuel cell systems that contain a non-aqueous electrolyte.

BACKGROUND OF THE DISCLOSURE

An electrochemical fuel cell is a device that reacts a fuel source with an oxidizing agent to produce an electric current. Commonly, the fuel source is hydrogen gas, and the oxidizing agent is oxygen. An example of a fuel cell utilizing these reactants is a proton exchange membrane fuel cell (PEMFC or PEM fuel cell), in which hydrogen gas is catalytically dissociated in the fuel cell's anode chamber into protons and electrons. The liberated protons are drawn through an electrolytic membrane into the fuel cell's cathode chamber. The electrons cannot pass through the membrane and instead must travel through an external circuit to reach the cathode chamber. In the cathode chamber, the protons and electrons react with oxygen to form water. The net flow of electrons from the anode to the cathode chamber produces an electric current, which can be used to meet the electrical load being applied to the fuel cell by an associated electrical, or energy-consuming, device, such as a vehicle, boat, light, appliance, household, etc.

The fuel cell's ability to transport hydrogen ions across the electrolytic membrane is a function of the hydration of the membrane. In the case of low-temperature fuel cells, such as PEM fuel cells and alkaline fuel cells (AFCs), the ionically-conductive electrolyte is a water-swollen, strongly acidic polymeric membrane (PEMFC) or an aqueous solution of a strong base such as potassium hydroxide (AFC). These ionically-conductive electrolytes are susceptible to drying (losing water) or flooding (absorbing excess water). Either occurrence can lead to poor performance of the fuel cell and premature failure. U.S. Pat. No. 6,059,943, which is incorporated herein by reference in its entirety for all purposes, describes many of the problems related to maintaining a correct water balance in electrochemical devices such as fuel cells.

SUMMARY OF THE DISCLOSURE

The present disclosure includes fuel cells and fuel cell systems that include a non-aqueous electrolyte. Fuel cells according to the present disclosure include an anode region that is adapted to receive an anode feed stream containing chemically bound hydrogen and which liberates protons at an anode of the fuel cell, a cathode region that is adapted to receive a stream containing oxygen, and an electrolytic barrier that separates the anode region from the cathode region and which contains a non-aqueous electrolyte. The non-aqueous electrolyte is preferably acidic or basic. The electrolyte may have an acid ionization constant ($K_a$) greater than $5 \times 10^{-6}$ at 25° C. if the non-aqueous electrolyte is an acid and a base ionization constant ($K_b$) greater than $5 \times 10^{-6}$ at 25° C. if the non-aqueous electrolyte is a base. The fuel cell has an operating temperature of less than 300° C., and may operate at temperatures above, at, and below 100° C.

DETAILED DESCRIPTION AND BEST MODE OF THE DISCLOSURE

Figure 1:
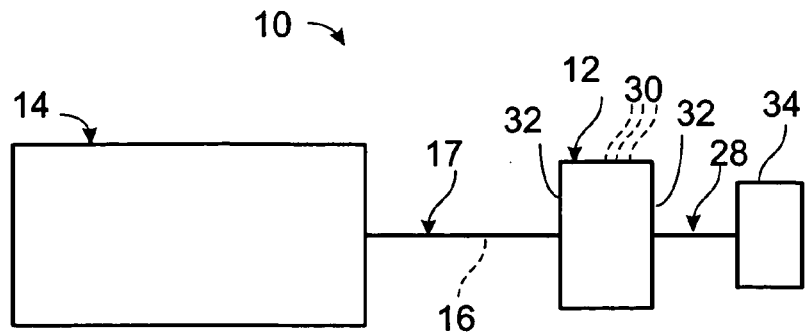
FIG. 1 is a schematic diagram of a fuel cell system constructed according to the present invention.

A fuel cell system according to the present disclosure is shown in FIG. 1 and generally indicated at 10. System 10 includes a fuel cell stack 12 and a source 14 of an anode feedstock 16, which is delivered to fuel cell stack 12 as stream 17. Anode feedstock 16 is any suitable composition or compositions that contain chemically bound hydrogen and which liberate protons at the anode of a fuel cell. An example of a suitable anode feedstock 16 is hydrogen gas. Other examples include methanol, hydrazine, ethanol and formaldehyde. Source 14 may include a storage tank or other reservoir containing feedstock 16, which is delivered to fuel cell stack 12 through any suitable mechanism, such as by pumping or by gravity flow. For example, source 14 may be a tank of compressed hydrogen gas, a tank or other fluid-holding container of methanol, etc. Another example is a hydride bed, which contains stored hydrogen gas.

Figure 2:
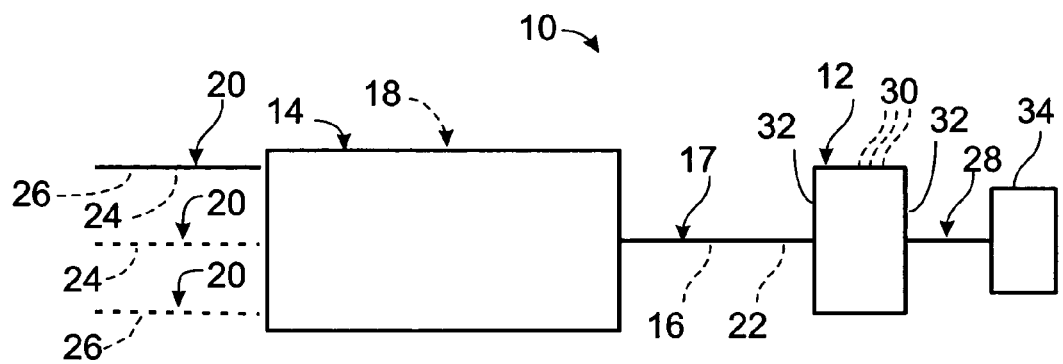
FIG. 2 is a schematic diagram of another fuel cell system constructed according to the present invention.

Alternatively, source 14 may include one or more devices that are adapted to produce anode feedstock 16, such as by a chemical reaction. An example of such a source 14 is shown in FIG. 2 and includes at least one fuel processor 18. Fuel processor 18 is adapted to receive a feed stream 20 that contains the feedstock for the fuel processor and is delivered to the fuel processor by any suitable mechanism, such as by pumping or by gravity flow. Fuel processor 18 produces an anode feedstock 16 in the form of hydrogen gas 22 from feed stream 20. Preferably, the fuel processor is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Suitable fuel processors for producing hydrogen gas are disclosed in U.S. Pat. Nos. 6,221,117, 5,997,594 and 5,861,137, and U.S. Provisional Patent Application Ser. No. 60/188,993, which was filed on Mar. 13, 2000 and is entitled "Fuel Processor," each of which is incorporated by reference in its entirety for all purposes.

Non-exclusive examples of suitable mechanisms by which fuel processor 18 produces hydrogen gas 22 include steam reforming, autothermal reforming, pyrolysis, partial oxidation, electrolysis and dissociation by irradiation. The composition and number of individual streams forming feed stream 20 will tend to vary depending on the mechanism by which fuel processor 18 is adapted to produce hydrogen gas 22. For example, if fuel processor 18 produces hydrogen gas by steam or autothermal reforming, feed stream 20 contains a carbon-containing feedstock 24 and water 26, such as shown in FIG. 2. If fuel processor 18 produces hydrogen gas by pyrolysis, irraditation or catalytic partial oxidation of a carbon-containing feedstock, feed stream 20 contains a carbon-containing feedstock and does not include water. If fuel processor 18 produces hydrogen gas by electrolysis, feed stream 20 contains water and does not contain a carbon-containing feedstock. When the feed stream contains water and a carbon-containing feedstock that is soluble with water, the feed stream may be a single stream, such as shown in a solid line in FIG. 2. When the carbon-containing feedstock is not miscible in water, the water and carbon-containing feedstock are delivered in separate feed streams 20, such as shown in dashed lines in FIG. 2.

Examples of carbon-containing feedstocks 24 include alcohols and hydrocarbons. Illustrative examples of suitable hydrocarbons include methane, propane, natural gas, diesel, kerosene, gasoline and the like. Illustrative examples of suitable alcohols include methanol, ethanol, propanol, and polyols, such as ethylene glycol and propylene glycol. A preferred, but by no means exclusive, feedstock for a fuel processor in the form of a steam reformer is methanol, and more particularly, fuel-cell grade methanol. Generally, catalysts that are used for conducting the water-gas shift reaction are suitable for steam reforming methanol. Commonly used (and commercially available) methanol steam-reforming catalysts consist of mixtures of copper and zinc oxide, and copper and chromium oxide. These catalyst formulations are very rapidly and completely poisoned by compounds of sulfur, compounds of phosphorous, volatile heavy metals (e.g., cadmium, mercury), and compounds of heavy metals. Therefore, the methanol is preferably free from these compounds so that the reforming catalyst is not poisoned. Similarly, other carbon-containing feedstocks should be sufficiently free from these or other compounds that will poison the reforming or other catalysts used to produce hydrogen gas therefrom.

Fuel cell stack 12 is adapted to produce an electric current 28 from the portion of anode feedstock 16 (or hydrogen gas 22) delivered thereto. Illustrative examples of suitable conventional fuel cells include proton exchange membrane (PEM) fuel cells and alkaline fuel cells. Fuel cell stack 12 typically includes a plurality of fuel cells 30 integrated together between common end plates 32, which contain fluid delivery/removal conduits (not shown). The number of cells in stack 12 may vary, such as depending upon such factors as the desired power output, the size limitations of the system, and the maximum available hydrogen (or other anode feedstock) supply. However, it is within the scope of the present disclosure that fuel cell stack 12 may include a single fuel cell 30, or multiple fuel cells 30. Typically, fuel cell stack 12 receives all or at least a substantial portion of stream 17 and produces electric current 28 therefrom. This current can be used to provide electrical power to an associated energy-consuming device 34, such as a vehicle or a house or other residential or commercial dwelling.

Illustrative examples of devices 34 include, but should not be limited to, a motor vehicle, recreational vehicle, boat, tools, lights or lighting assemblies, appliances (such as household or other appliances), household, signaling or communication equipment, etc. It should be understood that device 34 is schematically illustrated in FIGS. 1 and 2 and is meant to represent one or more devices or collection of devices that are adapted to draw electric current from the fuel cell system. By "associated," it is meant that device 34 is adapted to receive electrical power generated by stack 12. It is within the scope of the disclosure that this power may be stored, modulated or otherwise treated prior to delivery to device 34. Similarly, device 34 may be integrated with stack 12, or simply configured to draw electric current produced by stack 12, such as via electrical power transmission lines.

Figure 3:
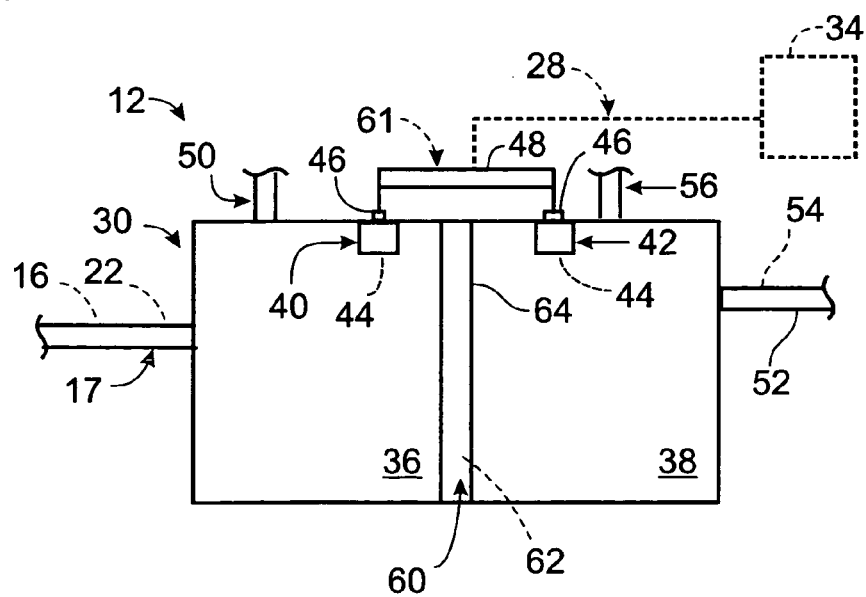
FIG. 3 is a schematic diagram of a fuel cell constructed according to the present invention.

In FIG. 3, an illustrative example of a fuel cell 30 constructed according to the present disclosure is shown. Fuel cell 30 includes an anode region 36 and a cathode region 38. The regions respectively include anode and cathode electrodes 40 and 42, which are schematically illustrated in FIG. 3. Any suitable electrode construction may be used. As an illustrative example, the electrodes may be porous and contain an electrocatalyst 44 and an electrically conductive support 46 that is in electrical communication with a current collection device 48 from which energy-consuming device 34 may directly or indirectly draw electric current 28.

The anode region 36 of the fuel cell receives at least a portion of stream 17. Anode region 36 is periodically purged, and releases a purge stream 50, which may contain hydrogen gas. Alternatively, hydrogen gas may be continuously vented from the anode region of the fuel cell. The purge streams may be vented to the atmosphere, combusted, used for heating, fuel or as a feedstock for the fuel processing assembly. The fuel cells of a fuel cell stack may exhaust a common purge stream consisting of the purge streams from the individual fuel cells contained therein. The purge streams from the fuel cells may be integrated into a suitable collection assembly through which the combined purge stream may be used for fuel, feedstock, heating, or otherwise harvested, utilized or stored.

Cathode region 38 receives a stream 52 containing oxygen 54, such as a stream of pure oxygen, an air stream, or an air stream that has been enriched with oxygen gas, and releases a cathode air exhaust stream 56 that is partially or substantially depleted in oxygen. The relative flow rate of air will generally be greater than that of pure oxygen because of the lower relative concentration of oxygen atoms provided.

The anode and cathode regions are separated by an electrolytic barrier 60 through which hydrogen ions (protons) may pass. Electrons liberated from hydrogen gas 22 (or other composition or compositions that contain chemically bound hydrogen and which liberate protons at the anode of the fuel cell stack) cannot pass through barrier 60, and instead must pass through an external circuit 61, thereby producing electric current 28 that may be used to meet the load applied by device 34. Current 28 may also be used to power the operation of the fuel cell system. The power requirements of the fuel cell system are collectively referred to as the balance of plant requirements of the fuel cell system.

Electrolytic barrier 60 includes a non-aqueous electrolyte 62 and a support structure, or containment structure, 64. Illustrative examples of suitable support structures 64 include absorbent media that absorb electrolyte 62 and porous structures. Illustrative examples of absorbent media include swollen polymer mats and films. Examples of suitable polymers are sold by DuPont under the trade name NAFION™, which is available in varying thicknesses, such as between 0.001 inches to 0.011 inches. Generally thinner sheets are preferred because they decrease the diffusion distance across the electrolyte. Illustrative examples of porous structures include mats, meshes, or channels, which contain the electrolyte by capillary action and/or the surface tension between the electrolytes and the porous structures. The support structure may be saturated with the electrolyte. Alternatively, less than full saturation may be used without adversely affecting the conductivity of the electrolyte, especially when the electrolyte is hydrophobic.

Electrolyte 62 may have a low or even exceptionally low vapor pressure, low viscosity, a melting point that is less than 100° C. and preferably less than 25° C. The electrolyte may have a high ionic conductivity and a range of electrochemical potential of at least 0.6 V and preferably at least 1.5 V, over which components of the electrolyte (other than protons or hydroxide ions) are neither oxidized nor reduced at the electrodes.

In conventional low-temperature fuel cells with water-based electrolytes, water is volatile at the operating temperature of the fuel cell. As used herein, the term "low-temperature" is used to refer to temperatures less than 100° C., "high-temperature" is used to refer to temperatures greater than 300° C., with "moderate-temperature" referring to temperatures between 100° C. and 300° C. Because water is volatile at the operating temperature of low-temperature fuel cells, the amount of water in the electrolyte must be continuously monitored to ensure the electrolyte is not dried from too little water or flooded from too much water. Too little water decreases the ionic conductivity of the electrolyte, while too much water results in droplets that impede the conduction of ions across the electrolyte. Furthermore, in fuel cells in which aqueous electrolytes are used, the fuel cell is typically configured to remove formed water so that water does not significantly increase the volume of the electrolyte. This water monitoring and maintenance requires significant monitoring and/or control to maintain the fuel cell's operability and efficiency.

A method for managing and removing excess water is to operate the fuel cell, or fuel stack, at an operating temperature at or above 100° C. Operating the fuel cell at this temperature results in water being vaporized. As a result, the water cannot significantly add to the volume of the electrolyte. However, low-temperature water-based electrolytes cannot be used above 100° C., and high-temperature inorganic electrolytes do not have sufficient ionic conductivity to function at low and/or moderate temperatures. In fact, some high-temperature electrolytes are not even liquids at low or even moderate temperatures. Examples of fuel cells that operate at temperatures greater than 100° C. include phosphoric acid fuel cells (180-200° C.), molten carbonate fuel cells (450-550° C.) and solid oxide fuel cells (600-700° C.).

Electrolyte 62 may exhibit very low solubility for water by using hydrophobic anions and cations. Because non-aqueous electrolyte 62 is insoluble or only slightly soluble in water, it produces a fuel cell 30 in which the amount of water in the electrolytic barrier 60 does not need to be managed.

Non-aqueous electrolyte 62 enables fuel cell 30 to be operated at moderate temperatures as well as at the low-temperature conditions at which aqueous electrolytes are typically operated. Worded another way, the ionic conductivity of fuel cells 30 is acceptable for operation of the fuel cells at both low and moderate temperatures. Therefore, it is within the scope of the disclosure that fuel cell 30 (and stack 12) will be operated at a range of temperatures in the range of 0° C. (or approximately 0° C.) and 300° C. (or approximately 300° C.). In many embodiments, fuel cell 30 will be operated at temperatures in the range of approximately 15° C. and approximately 200° C., and more typically in the range of approximately 15° C. and approximately 150° C. It is also within the scope of the present disclosure that the fuel cell, or fuel cell stack, may be operated at temperatures in the range of 0° C. or 15° C. and 100° C., at 100° C., and at temperatures greater than 100° C., such as temperatures up to 200° C. or 300° C.

An advantage of operating at an elevated temperature is that the efficiency of the fuel cell increases with increases in its operating temperature. As the temperature increases, the electrocatalysts on the anode and cathode sides become more active. Also, the anode catalyst becomes less sensitive to gas-phase impurities. Another result of operating the fuel cell at a higher operating temperature is that the exhaust streams will be at a higher temperature than corresponding streams of a low-temperature fuel cell. Accordingly, these streams will have an increased heating value, which may be harvested through heat exchange or which may remove or lessen the need to heat these streams prior to downstream use. Similarly, feed streams 17 and 52 may be delivered at a higher temperature than conventionally used with low-temperature fuel cells, thereby reducing or eliminating the need to cool these streams if they are available at temperatures higher than the temperatures acceptable for use in low-temperature fuel cells.

Non-aqueous electrolyte 62 may be either a pure compound or a mixture of compounds in which water is not a major component. Typically, the non-aqueous electrolyte should be less than 5% water on a molar basis. Because the electrolyte serves as a barrier to electrons, but not protons, the non-aqueous electrolyte should be a poor electrical conductor and a good ionic conductor. The non-aqueous electrolyte should have low volatility, meaning that the normal boiling point of the electrolyte is at least 90° C. and preferably at least 130° C., and more preferably at least 150° C. The non-aqueous electrolyte should have a melting point of less than 5° C. and more preferably less than 0° C.

Examples of non-aqueous electrolytes 62 are inorganic acids such as phosphoric acid or sulfuric acid, and low volatility hydrocarbons such as decane or hexadecane. Alternatively, the non-aqueous electrolyte may be a mixture of several compounds. These mixtures may include a hydrocarbon solvent combined with an acidic or basic solute, a polyalcohol solvent combined with an acidic or basic solute, a polyether solvent combined with an acidic or basic solute, an organic ionic liquid solvent combined with an acidic or basic solute, or any organic solvent with a normal boiling point of greater than 90° C. combined with an acidic or basic solute. The acidic solute should be a solute that is ionized in solution to yield protons. The basic solute should be a solute that is ionized in solution to yield hydroxide ions. Examples of suitable solvents are hexadecane, decane, kerosene, propylene carbonate, propylene glycol, o-dichlorobenzene, and 1,3,5-trichlorobenzene. Examples of suitable acidic solutes are hydrogen hexafluorphosphate, hydrogen tetraphenylborate, sulfuric acid, and perchloric acid. Examples of suitable basic solutes are tetramethylammonium hydroxide, tetraethylammonium hydroxide, tetrapropylammonium hydroxide, tetrabutylammonium hydroxide and other tetraalkylammonium hydroxides.

Another example of a non-aqueous electrolyte is an organic ionic liquid. Organic ionic liquids are discussed, for example, in M. Freemantle, "Eyes on Ionic Liquids," *Chemical Engineering and News*, May 15, 2000, p. 37-50, which is hereby incorporated by reference in its entirety for all purposes. In general an organic ionic liquid includes an organic salt that is liquid at room temperature, (i.e. the melting point of the salt is lower than room temperature) and ionization occurs when the salt is molten or dissolved.

The chemistry behind an organic ionic liquid forming the electrolyte in a fuel cell is illustrated below. Consider, for example, 1-ethyl-3-methyl-imidazoleum tetrafluoroborate, which is an organic ionic liquid (melting point 15° C. and boiling point>350° C.) that is commercially available from Aldrich Chemical Co. in Milwaukee, Wis. For this compound to serve as the electrolyte in a PEM fuel cell, the conjugate base would be the tetrafluoborate ion ($BF_4^-$), which is protonated at the anode to form the conjugate acid $HBF_4$. Other anions can be selected rather than tetrafluoborate for use with the 1-ethyl-3-methyl-imidazoleum cation. For example, other suitable anions include tetraphenylborate ($BPh_4^-$), and hexafluorophosphate ($PF_6^-$).

Examples of organic ionic liquids include 1,3-dialkylimidazoleum cations coupled to hydrophobic anions or hydrophylic anions. Specific examples include 1-buty-3-methylimidazolium hexafluorophosphate, 1-butylpyridinium nitrate, 1-ethyl-3-methylimidazoleum bis(trifluoromethanesulfonate), and 1-ethyl-3-methylimidazoleum bis(trifluoromethanesulfonyl)imide. The organic ionic liquid or liquids may themselves form electrolyte 62 or they may be the solvent for an acid or base, such as these discussed herein.

A preferred non-aqueous electrolyte 62 is either a strong acid or a strong base, since the electrolyte must serve as either a proton donor or a hydroxide-ion donor. For the purposes of the present disclosure, a strong acid is defined as an acid having an ionization constant ($K_a$), or first ionization constant if it is a polyproptic acid, greater than $5\times10^{-6}$, preferably greater than $1\times10^{-4}$, and more preferably, greater than $1\times10^{-2}$ at 25° C. Likewise, for the purposes of the present disclosure, a strong base is defined as a base having an ionization constant ($K_b$) greater than $5\times10^{-6}$, preferably greater than $1\times10^{-4}$, and more preferably, greater than $1\times10^{-2}$ at 25° C. As used herein, the term "acid" shall refer to a proton donor or Bronsted-Lowry acid and "base" shall refer to a hydroxide ion donor or Bronsted-Lowry base.

Strongly acidic non-aqueous electrolytes are used when the fuel cell relies on proton ions, for example proton exchange membrane fuel cells (PEMFCs), while strongly basic non-aqueous electrolytes are used when the fuel cell relies on hydroxide ions, such as in alkaline fuel cells (AFCs). Thus, non-aqueous electrolytes suitable for use in the present disclosure are typically strong acids and bases. Alternatively, non-aqueous electrolytes, such as those described in U.S. Pat. No. 5,965,054, which is hereby incorporated by reference in its entirety for all purposes, that are weak acids and bases may be modified by the addition of electrochemically active ions, i.e. protons or hydroxide ions, to form strongly acidic or strongly basic non-aqueous electrolytes.

Figure 4:
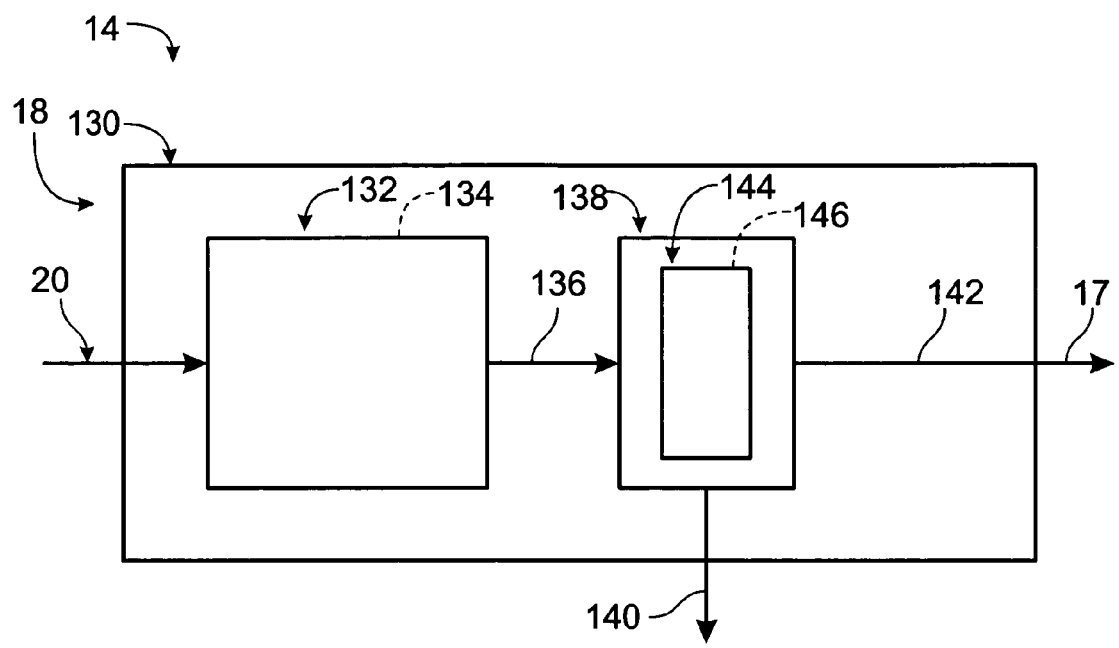
FIG. 4 is a schematic diagram of a fuel processor suitable for use in the fuel cell system shown in FIG. 2.

As discussed above, fuel processor 18 may utilize any suitable hydrogen-producing mechanism including steam reforming, autothermal reforming, electrolysis, irradiation, pyrolysis and catalytic partial oxidation. An example of a suitable fuel processor 18 is a steam reformer. An example of a suitable steam reformer is shown in FIG. 4 and indicated generally at 130. Reformer 130 includes a reforming, or hydrogen-producing, region 132 that includes a steam reforming catalyst 134. Alternatively, reformer 130 may be an autothermal reformer that includes an autothermal reforming catalyst. In reforming region 132, a reformate stream 136 is produced from the water and carbon-containing feedstock forming feed stream 20. The reformate stream typically contains hydrogen gas and impurities, and therefore is delivered to a separation region, or purification region, 138, where the hydrogen gas is purified. In separation region 138, the hydrogen-containing stream is separated into one or more byproduct streams, which are collectively illustrated at 140, and a hydrogen-rich stream 142 by any suitable pressure-driven separation process. In FIG. 4, hydrogen-rich stream 142 is shown forming stream 17.

An example of a suitable structure for use in separation region 138 is a membrane module 144, which contains one or more hydrogen permeable metal membranes 146. Examples of suitable membrane modules formed from a plurality of hydrogen-selective metal membranes are disclosed in U.S. Pat. No. 6,221,117, the complete disclosure of which is hereby incorporated by reference in its entirety for all purposes. In that patent, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels. Also disclosed in the above-identified application are tubular hydrogen-selective membranes, which also may be used. Other suitable membranes and membrane modules are disclosed in U.S. Pat. No. 6,547,858, which was filed on Jul. 19, 2000 and is entitled "Hydrogen-Permeable Metal Membrane and Method for Producing the Same," the complete disclosure of which is hereby incorporated by reference in its entirety for all purposes. Other suitable fuel processors are also disclosed in the incorporated patent applications.

The thin, planar, hydrogen-permeable membranes are preferably composed of palladium alloys, most especially palladium with 35 wt % to 45 wt % copper. These membranes, which also may be referred to as hydrogen-selective membranes, are typically formed from a thin foil that is approximately 0.001 inches thick. It is within the scope of the present disclosure, however, that the membranes may be formed from hydrogen-selective metals and metal alloys other than those discussed above, hydrogen-permeable and selective ceramics, or carbon compositions. The membranes may have thicknesses that are larger or smaller than discussed above. For example, the membrane may be made thinner, with commensurate increase in hydrogen flux. The hydrogen-permeable membranes may be arranged in any suitable configuration, such as arranged in pairs around a common permeate channel as is disclosed in the incorporated patent applications. The hydrogen permeable membrane or membranes may take other configurations as well, such as tubular configurations, which are disclosed in the incorporated patents.

Another example of a suitable pressure-separation process for use in separation region 138 is pressure swing absorption (PSA). In a pressure swing adsorption (PSA) process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from reformate stream 136. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent. Impurity gases such as $NH_3$, $H_2S$, and $H_2O$ adsorb very strongly on the adsorbent material and are therefore removed from stream 136 along with other impurities. If the adsorbent material is going to be regenerated and these impurities are present in stream 136, separation region 138 preferably includes a suitable device that is adapted to remove these impurities prior to delivery of stream 136 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. It should be understood, however, that other suitable adsorbent material compositions, forms and configurations may be used.

Figure 5:
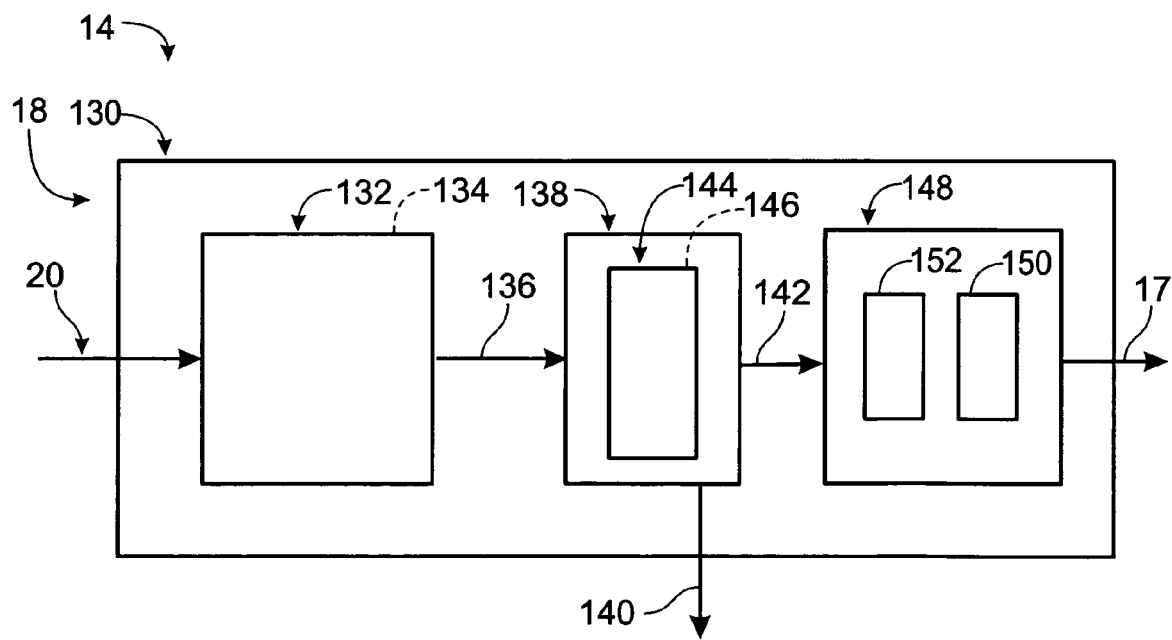
FIG. 5 is a schematic diagram of another fuel processor suitable for use in the fuel cell system shown in FIG. 2.

Reformer 130 may, but does not necessarily, further include a polishing region 148, such as shown in FIG. 5. Polishing region 148 receives hydrogen-rich stream 142 from separation region 138 and further purifies the stream by reducing the concentration of, or removing, selected compositions therein. For example, when stream 142 is intended for use in a fuel cell stack, such as stack 12, compositions that may damage the fuel cell stack, such as carbon monoxide and carbon dioxide, may be removed from the hydrogen-rich stream. The concentration of carbon monoxide should be less than 10 ppm (parts per million) to prevent the control system from isolating the fuel cell stack. Preferably, the system limits the concentration of carbon monoxide to less than 5 ppm, and even more preferably, to less than 1 ppm. The concentration of carbon dioxide may be greater than that of carbon monoxide. For example, concentrations of less than 25% carbon dioxide may be acceptable. Preferably, the concentration is less than 10%, even more preferably, less than 1%. Especially preferred concentrations are less than 50 ppm. It should be understood that the acceptable minimum concentrations presented herein are illustrative examples, and that concentrations other than those presented herein may be used and are within the scope of the present disclosure. For example, particular users or manufacturers may require minimum or maximum concentration levels or ranges that are different than those identified herein.

Region 148 includes any suitable structure for removing or reducing the concentration of the selected compositions in stream 142. For example, when the product stream is intended for use in a PEM fuel cell stack or other device that will be damaged if the stream contains more than determined concentrations of carbon monoxide or carbon dioxide, it may be desirable to include at least one methanation catalyst bed 150. Bed 150 converts carbon monoxide and carbon dioxide into methane and water, both of which will not damage a PEM fuel cell stack. Polishing region 148 may also include another hydrogen-producing device 152, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

Steam reformers typically operate at temperatures in the range of 200° C. and 700° C., and at pressures in the range of 50 psi and 1000 psi, although temperatures outside of this range are within the scope of the disclosure, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel processing system, fuel cell system, an external source, or a combination thereof, may provide the fuel for the heating assembly.

It is within the scope of the present disclosure that any other type of fuel processor may be used, such as those discussed above, and that any other suitable source of hydrogen gas may be used. Examples of other sources of hydrogen include a storage device, such as a storage tank or hydride bed, containing a stored supply of hydrogen gas.

Although discussed above in terms of a PEM fuel cell, it is within the scope of the present disclosure that non-aqueous Bronsted-Lowry electrolyte 60 may be implemented with other forms of fuel cells. For example, the system may be implemented with other low and moderate temperature fuel cells, such as alkaline fuel cells (AFCs) or direct methanol fuel cells (DMFCs).

INDUSTRIAL APPLICABILITY

The present disclosure is applicable to energy-producing systems, and more particularly to fuel cells and fuel cell systems.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A fuel cell, comprising:
   an anode region adapted to receive an anode feedstock comprising at least one composition that contains chemically bound hydrogen and which liberates protons at an anode of the fuel cell;
   a cathode region adapted to receive a stream containing oxygen; and
   an electrolytic barrier separating the anode region from the cathode region, wherein the electrolytic barrier includes a non-aqueous liquid electrolyte containing an organic ionic liquid, and further wherein the fuel cell has an operating temperature of less than 300° C.

2. The fuel cell of claim 1, wherein the non-aqueous liquid electrolyte is acidic.

3. The fuel cell of claim 2, wherein the non-aqueous liquid electrolyte has an acid ionization constant ($K_a$) greater than $5 \times 10^{-6}$ at 25° C.

4. The fuel cell of claim 2, wherein the non-aqueous liquid electrolyte has an acid ionization constant ($K_a$) in the range of $5 \times 10^{-6}$ and $7 \times 10^{-3}$ at 25° C.

5. The fuel cell of claim 2, wherein the non-aqueous liquid electrolyte has an acid ionization constant ($K_a$) greater than $1 \times 10^{-2}$ at 25° C.

6. The fuel cell of claim 1, wherein the non-aqueous liquid electrolyte is basic.

7. The fuel cell of claim 6, wherein the non-aqueous liquid electrolyte has a base ionization constant ($K_b$) greater than $5 \times 10^{-6}$ at 25° C.

8. The fuel cell of claim 6, wherein the non-aqueous liquid electrolyte has a base ionization constant ($K_b$) greater than $1 \times 10^{-2}$ 25° C.

9. The fuel cell of claim 1, wherein the organic ionic liquid is a solvent, and further wherein the non-aqueous liquid electrolyte includes a solute.

10. The fuel cell of claim 9, wherein the solute is an acidic solute.

11. The fuel cell of claim 10, wherein the acidic solute comprises at least one component selected from the group consisting of: hydrogen hexafluorophosphate, hydrogen tetraphenylborate, sulfuric acid, and perchloric acid.

12. The fuel cell of claim 9, wherein the solute is a basic solute.

13. The fuel cell of claim 12, wherein the basic solute includes a tetraalkylammonium hydroxide.

14. The fuel cell of claim 1, wherein the non-aqueous liquid electrolyte contains less than 5% water on a molar basis.

15. The fuel cell of claim 1, wherein the boiling point of the non-aqueous liquid electrolyte is at least 90° C.

16. The fuel cell of claim 1, wherein the boiling point of the non-aqueous liquid electrolyte is at least 130° C.

17. The fuel cell of claim 1, wherein the boiling point of the non-aqueous liquid electrolyte is at least 150° C.

18. The fuel cell of claim 1, wherein the melting point of the non-aqueous liquid electrolyte is less than 50° C.

19. The fuel cell of claim 1, wherein the melting point of the non-aqueous liquid electrolyte is less than 0° C.

20. The fuel cell of claim 1, wherein the operating temperature of the fuel cell is between 15° C. and 200° C.

21. The fuel cell of claim 1, wherein the operating temperature of the fuel cell is between 15° C. and 150° C.

22. The fuel cell of claim 1, wherein the operating temperature of the fuel cell is between 0° C. and 100° C.

23. The fuel cell of claim 1, wherein the operating temperature of the fuel cell is above 100° C.

24. The fuel cell of claim 1, wherein the operating temperature of the fuel cell is between 150° C. and 300° C.

25. The fuel cell of claim 1, wherein the operating temperature of the fuel cell is above the boiling point of water at the operating conditions of the fuel cell.

26. The fuel cell of claim 1, in combination with a source of the anode feedstock.

27. The fuel cell of claim 26, wherein the anode feedstock includes hydrogen gas and the source is adapted to deliver a stream containing hydrogen gas to the anode region of the fuel cell.

28. The fuel cell of claim 26, wherein anode feedstock includes methanol and the source is adapted to deliver a stream containing methanol to the anode region of the fuel cell.

29. The fuel cell of claim 26, wherein the anode feedstock includes hydrazine and the source is adapted to deliver a stream containing hydrazine to the anode region of the fuel cell.

30. The fuel cell of claim 26, wherein the anode feedstock includes formaldehyde and the source is adapted to deliver a stream containing formaldehyde to the anode region of the fuel cell.

31. The fuel cell of claim 26, wherein the anode feedstock includes ethanol and the source is adapted to deliver a stream containing ethanol to the anode region of the fuel cell.

32. The fuel cell of claim 26, wherein the source of the anode feedstock includes at least one storage tank containing the anode feedstock.

33. The fuel cell of claim 26, wherein the source includes a device adapted to produce the anode feedstock through a chemical reaction.

34. The fuel cell of claim 26, wherein the source includes a fuel processor with a hydrogen-producing region.

35. The fuel cell of claim 34, wherein the fuel processor is a steam reformer that includes a reforming catalyst.

36. The fuel cell of claim 34, wherein the fuel processor is adapted to produce the anode feedstock by at least one of the following methods: partial oxidation of a carbon-containing feedstock, electrolysis of water and irradiation of a carbon-containing feedstock.

37. The fuel cell of claim 34, wherein the hydrogen-producing region of the fuel processor is adapted to receive a feed stream that includes a carbon-containing feedstock and to produce therefrom a mixed gas stream containing hydrogen gas and other gases.

38. The fuel cell of claim 37, wherein the fuel processor further comprises a separation region adapted to receive the mixed gas stream and to separate the mixed gas stream into an at least substantially pure hydrogen stream and a byproduct stream containing substantially the other gases.

39. The fuel cell of claim 38, wherein the separation region of the fuel processor includes at least one hydrogen-selective membrane.

40. The fuel cell of claim 38, wherein the fuel processor includes a polishing catalyst bed adapted to increase the purity of the at least substantially pure hydrogen stream.

41. A fuel cell system, comprising:
means for producing an anode feedstock containing hydrogen gas;
at least one fuel cell comprising:
an anode region adapted to receive at least a portion of the anode feed stock;
a cathode region adapted to receive a stream containing oxygen; and
an electrolytic barrier separating the anode region from the cathode region, wherein the electrolytic barrier includes an acidic or basic non-aqueous electrolyte; wherein the non-aqueous electrolyte includes an organic ionic liquid and has an acid ionization constant ($K_a$) greater than $5 \times 10^{-6}$ at 25° C. if the non-aqueous electrolyte is an acid and a base ionization constant ($K_b$) greater than $5 \times 10^{-6}$ at 25° C. if the non-aqueous electrolyte is a base; and further wherein the fuel cell has an operating temperature of less than 300° C.

42. The fuel cell system of claim 41, wherein the non-aqueous electrolyte is an acid.

43. The fuel cell system of claim 41, wherein the non-aqueous electrolyte is a base.

44. The fuel cell system of claim 41, wherein the non-aqueous electrolyte further includes sulfuric acid.

45. The fuel cell system of claim 41, wherein the organic ionic liquid is a solvent and the non-aqueous electrolyte further includes an acidic or basic solute.

46. The fuel cell system of claim 45, wherein the acidic solute is selected from the group consisting of: hydrogen hexafluorophosphate, hydrogen tetraphenylborate, sulfuric acid, and perchloric acid.

47. The fuel cell system of claim 45, wherein the basic solute is a tetraalkylam monium hydroxide.

48. The fuel cell system of claim 41, wherein the non-aqueous electrolyte has a $K_a$ greater than $1\times10^{-2}$ at 25° C. if the electrolyte is an acid and a $K_b$ greater than $1\times10^{-2}$ 25° C. if the electrolyte is a base.

49. The fuel cell system of claim 41, wherein the non-aqueous electrolyte has a $K_a$ greater than $1\times10^{-4}$ at 25° C. if the electrolyte is an acid and a $K_b$ greater than $1\times10^{-4}$ at 25° C. if the electrolyte is a base.

50. The fuel cell system of claim 41, wherein the non-aqueous electrolyte contains less than 5% water on a molar basis.

51. The fuel cell system of claim 41, wherein the boiling point of the non-aqueous electrolyte is at least 90° C.

52. The fuel cell system of claim 41, wherein the boiling point of the non-aqueous electrolyte is at least 130° C.

53. The fuel cell system of claim 41, wherein the boiling point of the non-aqueous electrolyte is at least 150° C.

54. The fuel cell system of claim 41, wherein the melting point of the non-aqueous electrolyte is less than 5° C.

55. The fuel cell system of claim 41, wherein the melting point of the non-aqueous electrolyte is less than 0° C.

56. The fuel cell system of claim 41, wherein the operating temperature of the fuel cell is above the boiling point of water at the operating conditions of the fuel cell.

* * * * *

UNITED STATES PATENT AND TRADEMARK OFFICE
CERTIFICATE OF CORRECTION

| | | |
|---|---|---|
| PATENT NO. | : 7,258,946 B2 | Page 1 of 1 |
| APPLICATION NO. | : 10/745407 | |
| DATED | : August 21, 2007 | |
| INVENTOR(S) | : David J. Edlund | |

It is certified that error appears in the above-identified patent and that said Letters Patent is hereby corrected as shown below:

Column 11,
Line 41, after "is less than" please delete "50° C." and insert --5° C.-- therefor.

Column 13,
Line 11, delete "tetraalkylam monium" and insert --tetraalkylammonium-- therefor.

Signed and Sealed this

Twenty-seventh Day of November, 2007

JON W. DUDAS
*Director of the United States Patent and Trademark Office*